(12) United States Patent
Harris, Jr. et al.

(10) Patent No.: US 8,107,610 B2
(45) Date of Patent: Jan. 31, 2012

(54) CALLBACK PROCESSING OF INTERACTIVE VOICE RESPONSE REQUESTS

(75) Inventors: Isaiah Harris, Jr., Dunwoody, GA (US); Robert A. Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 910 days.

(21) Appl. No.: 11/448,289

(22) Filed: Jun. 6, 2006

(65) Prior Publication Data
US 2007/0280460 A1 Dec. 6, 2007

(51) Int. Cl.
*H04M 3/00* (2006.01)
(52) U.S. Cl. ......... 379/265.03; 379/265.09; 379/210.01; 379/207.15; 704/251; 704/257; 704/270; 704/9; 704/7
(58) Field of Classification Search .............. 379/265.01–265.02, 88.01–88.04, 379/210.01
See application file for complete search history.

(56) References Cited

U.S. PATENT DOCUMENTS

| | | | | |
|---|---|---|---|---|
| 5,309,505 A * | 5/1994 | Szlam et al. | ............... | 379/88.01 |
| 5,309,595 A * | 5/1994 | Salecker et al. | ........... | 15/104.33 |
| 6,345,239 B1 * | 2/2002 | Bowman-Amuah | .............. | 703/6 |
| 6,411,687 B1 * | 6/2002 | Bohacek et al. | ........... | 379/88.21 |
| 6,499,013 B1 * | 12/2002 | Weber | ........................... | 704/257 |
| 7,092,506 B1 * | 8/2006 | Bers et al. | ................ | 379/265.02 |
| 2001/0024497 A1 * | 9/2001 | Campbell et al. | ........ | 379/265.09 |
| 2003/0063732 A1 * | 4/2003 | Mcknight | ................ | 379/210.01 |
| 2005/0047579 A1 * | 3/2005 | Salame | .................... | 379/265.09 |
| 2005/0286705 A1 * | 12/2005 | Contolini et al. | ........ | 379/265.02 |
| 2007/0086585 A1 * | 4/2007 | Dorricott et al. | ......... | 379/265.01 |

* cited by examiner

*Primary Examiner* — Fan Tsang
*Assistant Examiner* — Ibraham Sharifzada

(57) ABSTRACT

Embodiments of the present disclosure provide methods and devices for processing a call to a call distribution point. In this regard, one embodiment of such a method, among others, can be broadly summarized by the following steps: receiving a request from a caller to the call distribution point; parsing the request for information included in the request indicating the nature of the request; assigning a call recipient to service the request based on the information obtained in the parsing step; and acknowledging receipt of the request to the caller and providing an estimate of time before the assigned call recipient will be able to service the call. Other methods and devices are also provided.

18 Claims, 6 Drawing Sheets

CALLBACK PROCESSING OF INTERACTIVE VOICE RESPONSE REQUESTS

TECHNICAL FIELD

The present disclosure is generally related to interactive voice response processes and, more particularly, is related to automated callback techniques for call distribution points.

BACKGROUND

In a call center, a call center agent or agents typically communicate with customers through inbound calls, outbound calls, or both. When all the call center agents are busy servicing other calls, an inbound call may be placed in a queue with other inbound calls that are waiting for a call center agent to become available to service the inbound call that was the first into the queue. A caller of an inbound call that has been placed in the queue may become frustrated being put on hold and having to remain on the line to wait for his or her turn to be serviced. This is problematic for the call center.

Thus, a heretofore unaddressed need exists in the industry to address the aforementioned deficiencies and inadequacies.

SUMMARY

Embodiments of the present disclosure provide methods and devices for processing a call to a call distribution point. In this regard, one embodiment of such a method, among others, can be broadly summarized by the following steps: receiving a request from a caller to the call distribution point; parsing the request for information included in the request indicating the nature of the request; assigning a call recipient to service the request based on the information obtained in the parsing step; and acknowledging receipt of the request to the caller and providing an estimate of time before the assigned call recipient will be able to service the call.

Embodiments also include a computer readable medium having a computer program for performing the above steps. Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
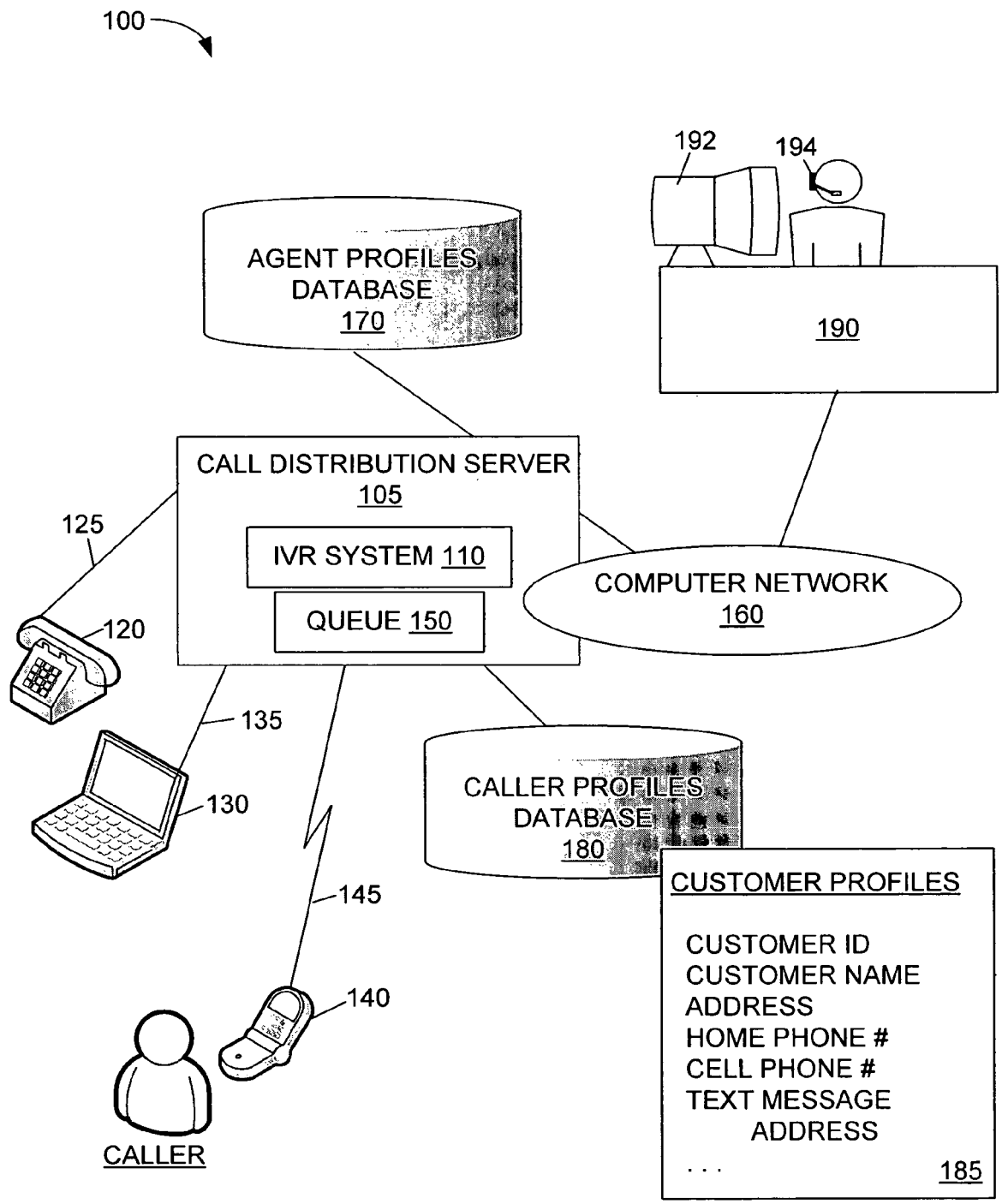
FIG. 1 is a block diagram of a call distribution system of one embodiment of the present disclosure.

FIG. 1 schematically illustrates a call distribution system 100 of one embodiment of the present disclosure. Call distribution system 100 includes an interactive voice response (IVR) system 110 operatively coupled to an external Public Switched Telephone Network (PSTN) telephone 120, an external computer 130, and an external wireless telephone or device 140. While telephones 120, 140, and computer 130 are expressly illustrated in the figure as examples of communication devices, more and/or different external devices may be utilized in alternative embodiments of the system 100.

In one embodiment, PSTN telephone 120 is operatively coupled to the IVR system 110 via PSTN network (not shown) over communication channel or path 125. Path 125 is the route over which data is transferred between the PSTN telephone 120 and IVR system 110. Path 125 may traverse one or more communication networks, such as PSTN network. Computer 130 is operatively coupled to the IVR system 110 over a data network, such as the Internet (not shown) via data channel or path 135. Path 135 is the route over which data is transferred between the computer 130 and IVR system 110. Path 135 may traverse one or more communication networks, such as the data network. Wireless telephone 140 is operatively coupled to the IVR system 110 via a wireless telephone network (not shown) and path 145. Path 145 is the route over which data is transferred between the wireless telephone 140 and IVR system 110. Path 140 may traverse one or more communication networks, such as the wireless telephone network. The respective networks and systems may be linked to one other within the call distribution system 100. As such, a wireless network may have a gateway to the data network and/or PSTN network, for example.

The IVR system 110 may reside in or be hosted by a call distribution server 105. The call distribution server 105 includes a call queue 150 and the interactive voice response system 110. Call distribution server 105 communicates with a telecommunication switch (not shown) and a computer network 160. Computer network 160 includes an agent profiles database 170 and a caller profiles database 180. An agent profiles database 170 contains profiles of agents (or other call recipients) with information such as the types of calls handled by the agent (or other type of call recipients). A caller profiles database 180 contains profiles 185 of callers with information such as preferred contact numbers or addresses.

Accordingly, call distribution server 105 may include interface software and hardware as would occur to those skilled in the art. The telecommunication switch may be operatively coupled to a PSTN.

Computer network 160 can be in the form of a Local Area Network (LAN), Wide Area Network (WAN), such as the Internet, or other network type as would occur to those skilled in the art. It should be recognized that computer network 160 may include one or more elements of a PSTN. A number of agent workstations 190, one of which is shown in the figure, may be coupled to computer network 160. Agent workstations 190 each include at least one computer 192.

To communicate with a caller located at telephone 120, 140, the agent workstation 190 further includes a telephone unit and a dialing module programmed within computer 192.

Telephone units may be in the form of a handset, a headset 194 (as shown in the figure), or another arrangement as would occur to those skilled in the art. The dialing module may be in the form of a soft phone, or another arrangement as would occur to those skilled in the art. In an alternative embodiment, the dialing module can be programmed within call distribution server 105 and accessible by the agent workstation 190. To communicate with a caller located at computer 130, computer 192 may establish voice over Internet Protocol (VoIP) communications with the computer 130.

The call distribution server 105 incorporates a unique technique whereby queue 150 and IVR system 110 are operatively integrated to enable callers to leave contact information in a message so that an agent (or other call recipient) may call the caller back when the agent becomes available to service the call. Instead of waiting for an available agent and being placed in a queue, the caller is able to leave a message and an agent may then call the user back at a location and/or a time of the caller's choosing. One embodiment of the technique is callback procedure 200 shown in FIG. 2.

Figure 2:
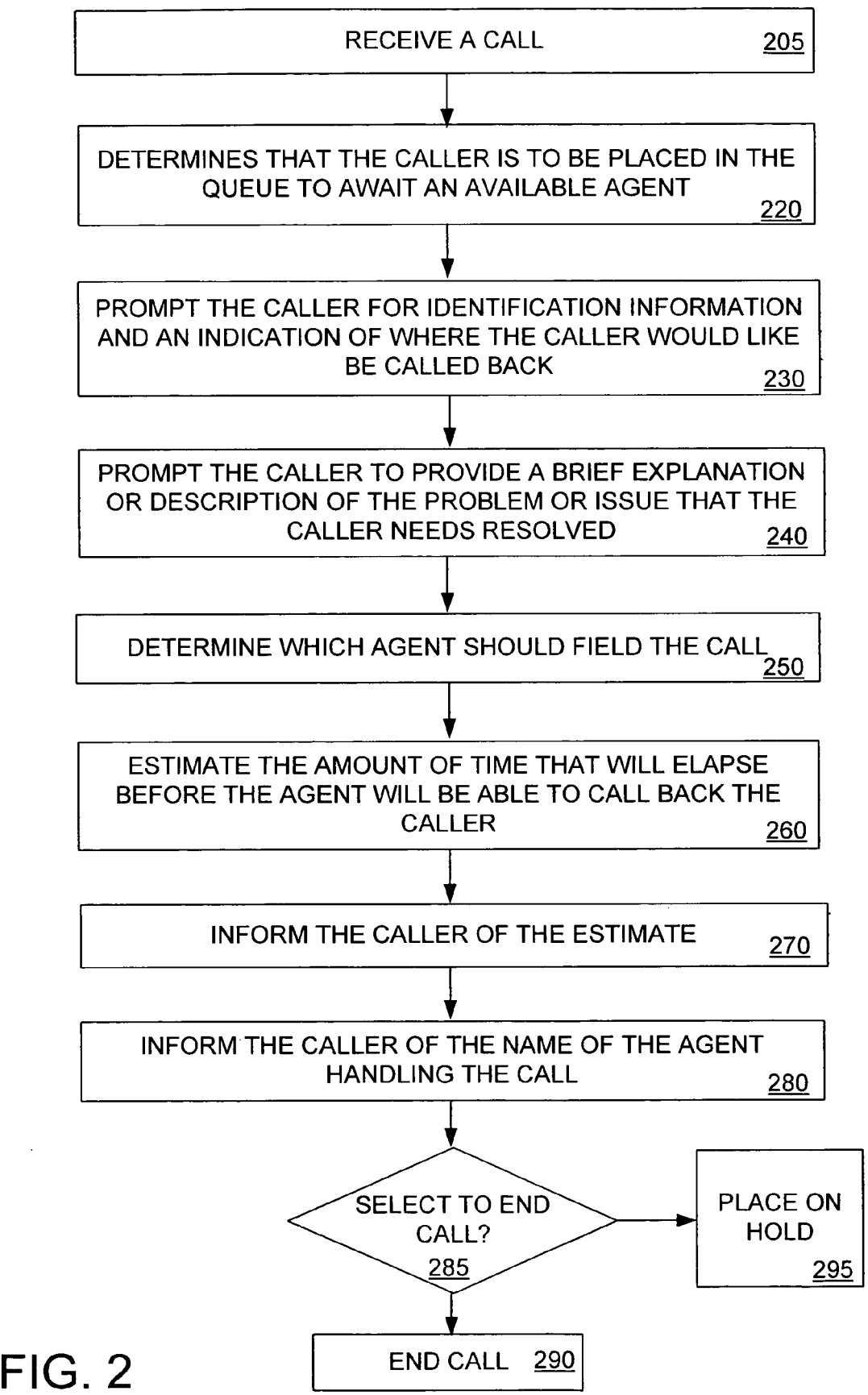
FIG. 2 is a flow chart describing one embodiment of a method for processing a call to a call distribution system such as that shown in FIG. 1.

Referring to FIG. 2, one embodiment of a method for processing a call to a call distribution point, such as a call center, is described. In this method, a caller calls the IVR system 110, and the IVR system 110 receives (205) the call and makes a determination that the caller is to be placed (220) in the queue to await an available agent. Thus, the IVR system 110 prompts (230) the caller for identification information and an indication of where (e.g., telephone number, network address, instant messaging address, etc.) the caller would like the IVR system 110 to call back the caller. This information may be prestored in a caller profile 185 that can be retrieved from the caller profiles database 180 based on the identification information provided by the caller, such as a telephone number, an account number, caller identification number, or the caller's name. Alternatively, the caller can provide this information to the IVR system 110 during the call. Note, embodiments of the present disclosure are not limited to communications involving telephone number. For example, a caller may request that a "callback" be made to an instant messaging address, where the caller and the agent may communicate during an instant messaging chat session.

In addition, the caller is prompted (240) to provide a brief explanation or description of the problem or issue that the caller needs resolved by the agent that was the impetus for the call. For example, a caller often seeks information relating to a product for sale by a call center, a service performed by the call center, etc.

In one embodiment, the statement provided by the caller is recorded and parsed to obtain information that is recognized by the IVR system 110 to identify the nature of the statement. For example, the statement may be parsed to identify one or more keywords in the statement that are indicative of the nature of the statement. Accordingly, a determination may be made by the IVR system 110 as to how to best route the call based on keyword analysis, in one embodiment. For example, certain agents may have certain areas of expertise or experience. Therefore, calls may be routed or assigned to the agents that are best-suited to service the calls based upon the subject matter or topic of the caller's statement or other factors that may be ascertained from the caller's request. For example, in some embodiments, analysis of a caller's request may ascertain an anger or frustration level of the caller based upon keywords used in the request and/or the volume level in which they were expressed. Alternatively, in some embodiments, the IVR system 110 may route the request to the agent that has the least amount of calls currently waiting to be serviced by the agent and/or an agent that is particularly suited for handling frustrated customers.

After a determination is made (250) as to which agent should field the call, an estimate of the amount of time that will elapse before the agent will be able to call back the caller is made (260). The estimate is based upon the amount of calls that have to be serviced by the agent before the agent can call back the caller and estimates of how long each of the calls in the agent's queue will take to be serviced. After the estimate of the amount of time is made for calling the caller back, the caller may be informed (270) of the estimate and, perhaps, of the agent's name (280) that will be handling the call. For example, the telephone server may direct the IVR system 110 to provide a message to the caller including a greeting for the caller and an estimated period before the caller is to be called back by an available agent. For example, a caller may be presented with an automated voice playback saying, "We have received your request and Suzie will call you back at about 11:30." In this way, the caller can end the call and tend to other matters, if the caller chooses (285) to end the call after being prompted by the IVR system. As such, the call is ended (290) and Suzie will call the caller back when Suzie is available to service the call. Otherwise, the caller may elect to remain connected to the IVR system and be placed on hold (295) until Suzie becomes available to handle the call.

As discussed, in one embodiment, keyword analysis is performed on the statement left by the caller that identifies the topic of the statement. As an example, keyword analysis may determine the topic as being television reception. This information is then used to assign the call to an agent (e.g., "Suzie") experienced in servicing television reception-type calls. Also, it may have been previously determined (e.g., from statistical analysis) that calls pertaining to television reception issues, on average, take six minutes to resolve. Therefore, if the agent "Suzie" has 4 other television reception type calls in her queue before the most recent call, then the most recent call may be expected to be serviced in 24 minutes (4×6 minutes=24 minutes). This estimate is used to inform the caller that the agent will likely call the caller back in 24 minutes at a location previously provided by the caller. As an alternative, the customer may also ask to be called back at a particular time, in some embodiments.

Figure 3:
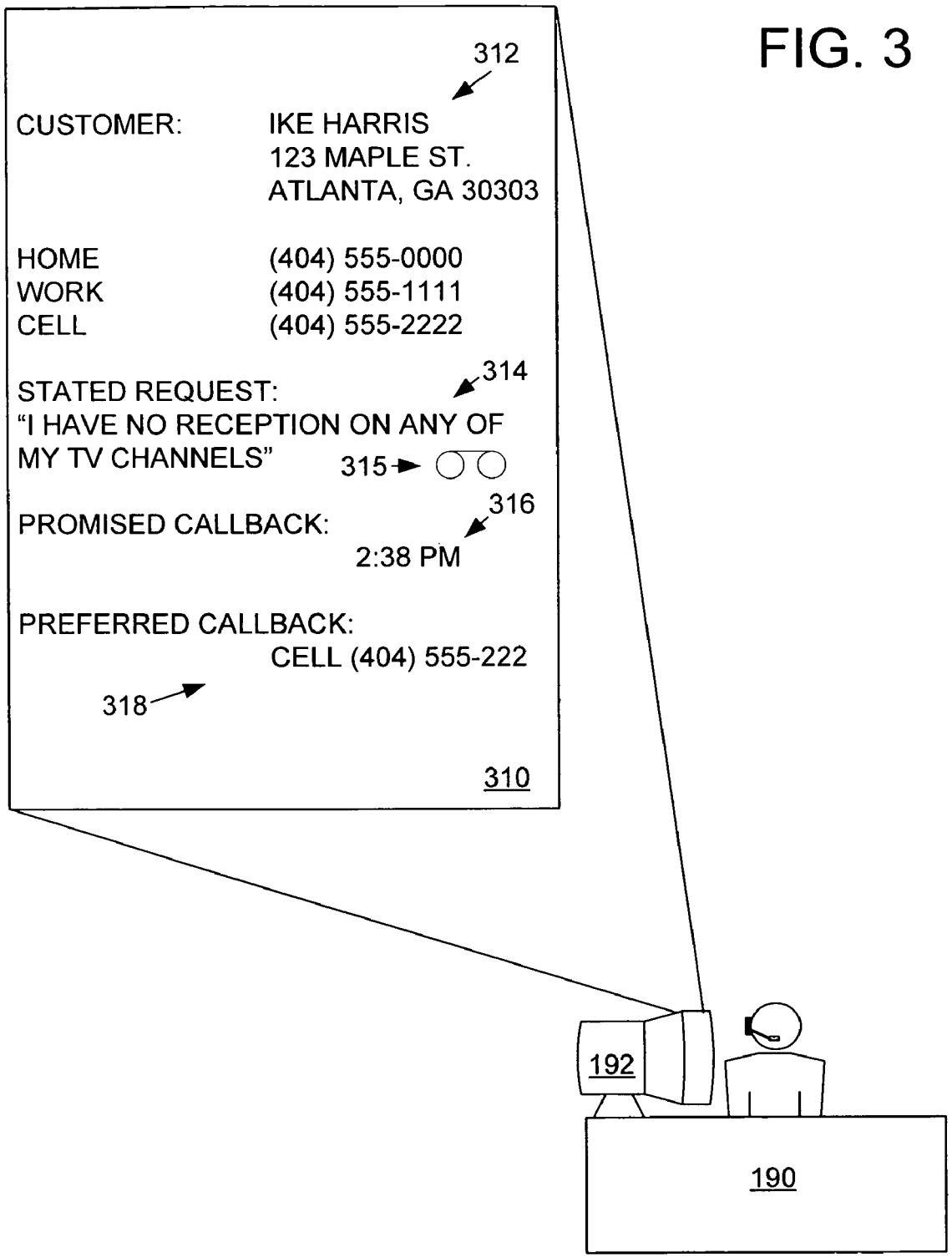
FIG. 3 is a diagram depicting one embodiment of a trouble ticket as displayed on an agent's computer display such as that shown in FIG. 1.

In one embodiment, a trouble ticket is generated and electronically sent to a desktop of the agent that is being assigned to the call or request. The caller profile may be attached or included with the trouble ticket along with an audio recording of the caller's statement describing the reason for the call. Alternatively, the content of the statement may be electronically transcribed from voice to text and recorded as a text message. FIG. 3 shows one embodiment of a trouble ticket as displayed on an agent's computer display 192. As shown, the trouble ticket 310 includes customer profile information 312, a description of the type of request 314 with an icon 315 that may be selected to hear an audio recording of the request, the estimate of time that the caller is expecting to receive a callback 316, a callback number or the contact preference for the customer 318, etc. In this way, if the agent is not able to make the callback by the stated time (e.g., 2:38 P.M.), the agent can apologize to the caller for calling back late when the agent chats with the caller during the callback.

Figure 4:
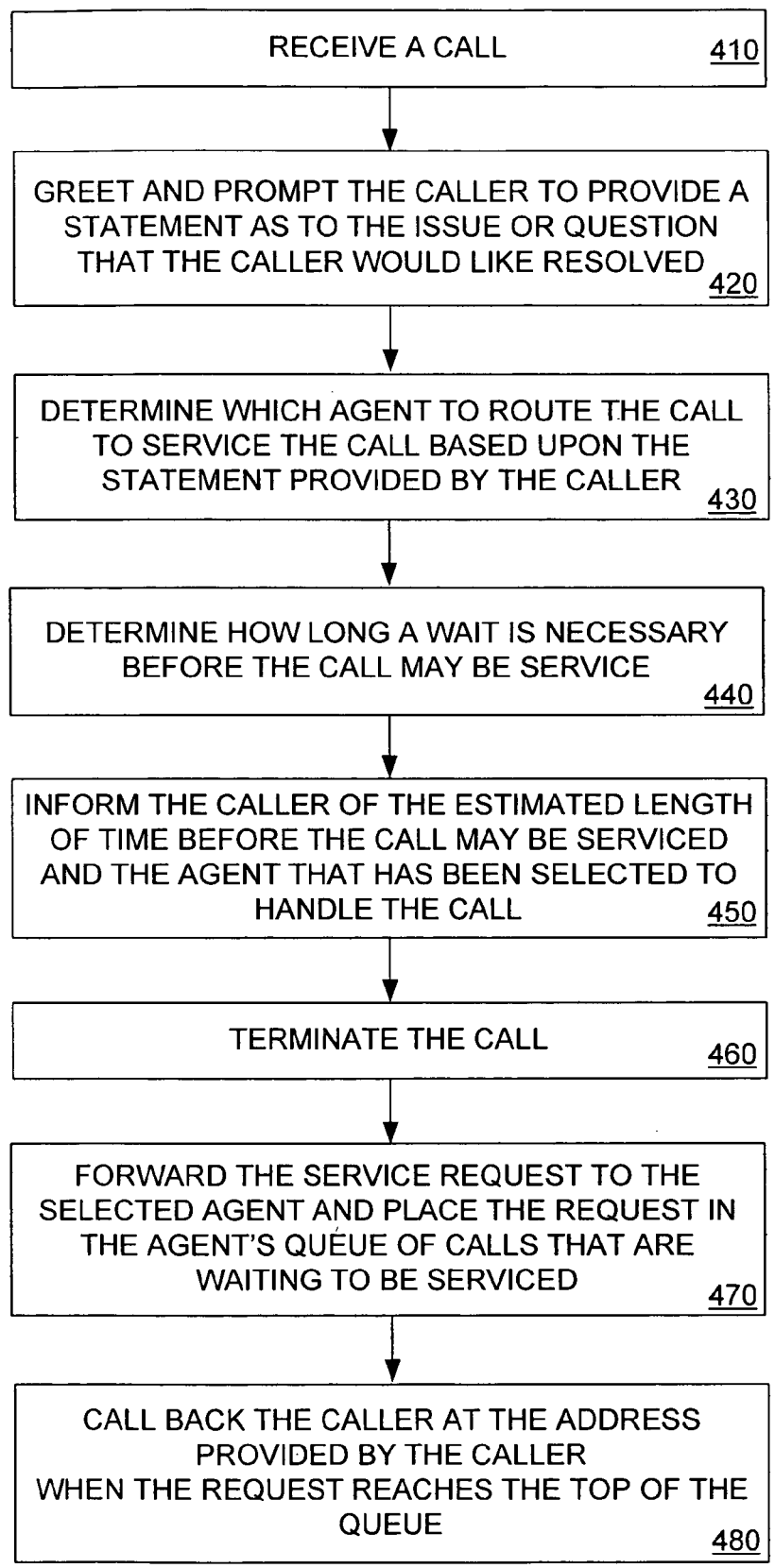
FIG. 4 is a flow chart describing one embodiment of a method for processing a request to a call distribution system such as that shown in FIG. 1.

Referring now to FIG. 4, one embodiment of a method for processing a request to a call distribution point is described. The method includes the step of receiving (410) a call to a call distribution point. The call is answered, and the caller is greeted and prompted (420) to provide a statement as to the issue or question that the caller would like resolved. In one embodiment, the caller may be personally greeted based on the caller-id information obtained from the caller's telephone number.

Based upon the statement provided by the caller, a determination is made (430) as to which agent (or recipient) to route the call to service the call. Accordingly, a determination is made (440) as to how long a wait is necessary before the call may be service. The caller is informed (450) of the estimated length of time before the call may be serviced and the agent that has been selected to handle the call. If the length of time is greater than a threshold value (e.g., 5 minutes), the caller is prompted to provide an address, such as a telephone number, where an agent may call back the caller to service the call. In some embodiments, the caller may be provided the option of terminating the call and the service request if a callback is not a feasible option for the caller. Further, the caller may, in response to a prompt, ask to be called back at a certain time, in some embodiments.

Otherwise, the call is terminated (460) and the service request is forwarded (470) to the selected agent and placed in the agent's queue of calls that are waiting to be serviced. When the request reaches the top of the agent's queue, the agent calls (480) back the caller at the address provided by the caller.

Figure 5:
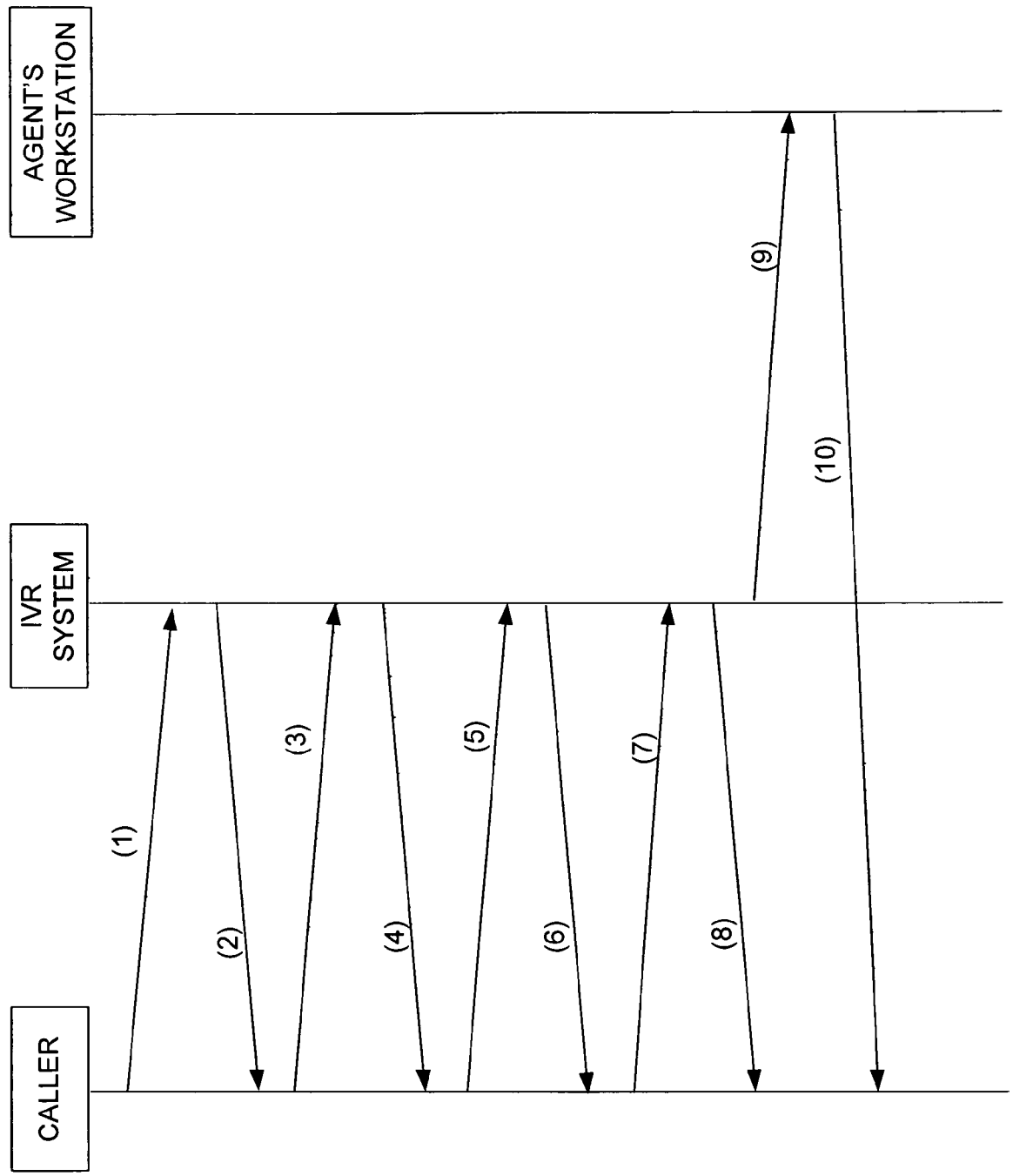
FIG. 5 is a process flow diagram of a sample interaction between a caller and a call distribution system such as that shown in FIG. 1.

Next, a process flow of a sample interaction between a caller and a call distribution system is illustrated in FIG. 5. In this example, a caller calls (1) an IVR system. The IVR system receives the call and prompts (2) for the caller to provide customer identification information, a statement of the customer request, and customer contact preference. In this example, the IVR responds with the following message: "Welcome to ACME Satellite TV. Please state your name or account number." The caller replies (3) with his name, "Ike Harris." Then, the IVR system 110 prompts (4) the caller to "Please describe your request," at which the caller states (5), "I have no reception on any of my TV channels." Based on the words "reception" and "TV" in the statement, the IVR system may identify that the issue of the call has to do with TV reception problems. From the agent profiles database, the IVR system also determines the agent (or call recipient) that handles TV reception type of problems.

As such, the IVR system determines the agent that is preferred to handle the call and that the agent currently has a backlog of calls that the agent is servicing. Accordingly, the IVR system prompts (6) the caller to provide a telephone number with the message "Should we call you back at this number or another?" The caller responds (7) with "Call my cell." The IVR system then informs (8) the caller that an agent will be calling him back by playing the following message, "Thank you, Mr. Harris. Julie is assigned to your request. She will call you back in about ten minutes at your cell phone." A trouble ticket is created and sent (9) to the agent's desktop (Julie's desktop) selected to handle the call. Accordingly, the agent responds in about ten minutes by calling back (10) the caller. For example, the agent may state, "Mr. Harris, this is Julie at ACME Satellite TV. We have tested your link and reset your set-top box. Your service should now be restored. Can I be of further assistance?" As such, servicing of the call continues until the caller is satisfied.

Figure 6:
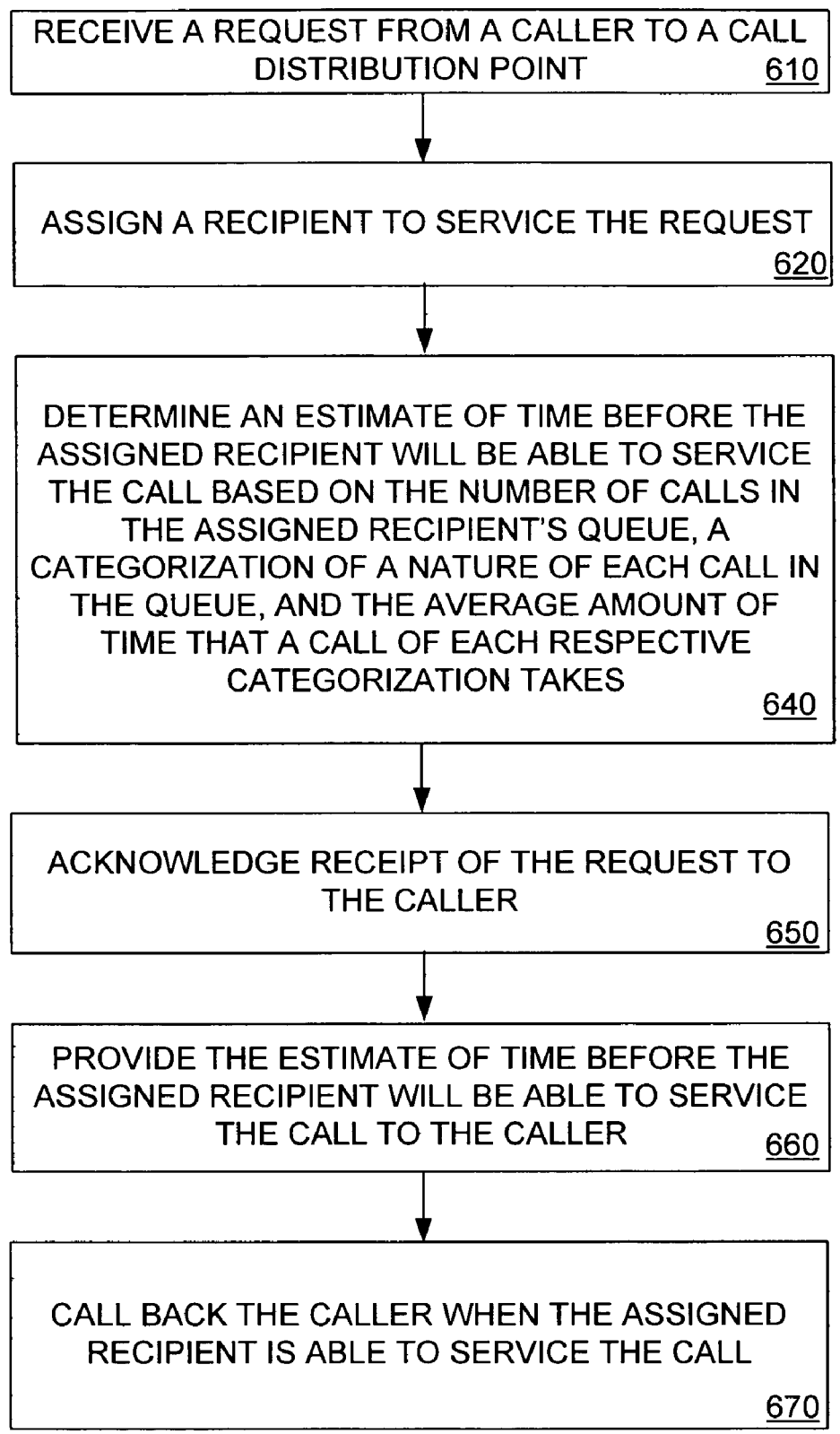
FIG. 6 is a flow chart describing one embodiment of a method for processing a call to a call distribution system such as that shown in FIG. 1.

Referring now to FIG. 6, one embodiment of a method for processing a call to a call distribution point, such as a call center, is described. The method includes the step of receiving (610) a request from a caller to the call distribution point. In response, the call distribution point assigns (620) an recipient, such as an agent, to service the request and determines (630) an estimate of time before the assigned recipient will be able to service the call based on the number of calls in the assigned recipient's queue, a categorization of a nature of each call in the queue, and the average amount of time that a call of each respective categorization takes. The call distribution point also acknowledges (640) receipt of the request to the caller and provides (650) the estimate of time before the assigned recipient will be able to service the call. Accordingly, the recipient calls (660) back the caller when the assigned recipient is able to service the call.

Advantageously, embodiments of the call distribution system 100 provide a caller to deposit a request without having to wait for his or her request to be serviced while the caller remains connected to the call distribution point. Certain embodiments of the present disclosure can be implemented in hardware, software, firmware, or a combination thereof. In some embodiments, for example, logic for the call distribution server 105 is implemented in software or firmware that is stored in a memory and that is executed by a suitable instruction execution system. If implemented in hardware, as in an alternative embodiment, the logic for the call distribution server 105 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing steps in a process or as modules, segments, or portions of code which include one or more executable instructions for implementing specific logical functions, and alternate implementations are included within the scope of selected embodiments of the present disclosure in which functions may be executed out of order from that shown or discussed, including substantially concurrently or in reverse order, depending on the functionality involved, as would be understood by those reasonably skilled in the art of the present disclosure.

Components of the call distribution system 100, in some embodiments, comprise an ordered listing of executable instructions for implementing logical functions, which can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of the present disclosure includes embodying the functionality of the preferred embodiments of the present disclosure in logic embodied in hardware or software-configured mediums.

It should be emphasized that the above-described embodiments of the present disclosure are merely possible examples of implementations, merely set forth for a clear understanding of the principles of the disclosures. Many variations and modifications may be made to the above-described embodiments without departing substantially from the spirit and principles of the disclosure. All such modifications and variations are intended to be included herein within the scope of this disclosure.

Therefore having thus described the invention, at least the following is claimed:

1. A method of processing a call to a call distribution point, comprising:
   receiving a freeform spoken natural language request from a caller to the call distribution point;
   parsing the freeform spoken natural language request for keywords indicating a nature of the freeform spoken natural language request;
   assigning a call recipient to service the request based on the nature of the request and based on a database of call recipient profiles;
   acknowledging, via spoken natural language, receipt of the freeform spoken natural language request to the caller and providing an estimate of time before the call recipient will be able to service the call; and
   obtaining a non-telephone number contact address for the caller from a pre-stored caller profile at which the call recipient is to contact the caller, wherein the pre-stored profile contains a plurality of contact addresses for the caller that are organized in accordance with a time of day that is preferred to be used in a call back.

2. The method of claim 1, wherein parsing includes parsing the freeform spoken natural language request for at least one keyword and the assigning the call recipient is implemented based on at least one of the at least one keyword recognized in the parsing.

3. The method of claim 1, further comprising:
   detecting a volume level of the call to further indicate the nature of the freeform spoken natural language request.

4. The method of claim 1, further comprising:
   forwarding a copy of the freeform spoken natural language request to the call recipient.

5. The method of claim 1, wherein the freeform spoken natural language request is parsed for keywords to make a determination of an issue that the caller would like resolved, wherein the call recipient is assigned based upon this determination.

6. The method claim 1, further comprising:
   announcing a name of the call recipient assigned to service the call to the caller.

7. The method of claim 1, further comprising:
   prompting the caller to provide a contact address where the call recipient is to call back the caller.

8. The method of claim 1, wherein the call recipient is assigned based on a relative queue size of the call recipient in comparison to other candidates for handling the call.

9. The method of claim 1, further comprising:
   determining the estimate of time based on the number of calls in call recipient's queue, a categorization of a nature of each call in the queue, and an average amount of time that a call of each respective categorization takes.

10. A non-transitory computer readable medium having a program for processing a call to a call distribution point, the program having instructions for performing the steps of:
    receiving a freeform spoken natural language request from a caller to the call distribution point;
    parsing the freeform spoken natural language request for keywords indicating a nature of the freeform spoken natural language request;
    assigning a call recipient to service the request based on the nature of the request and based on a database of call recipient profiles;
    acknowledging, via spoken natural language, receipt of the freeform spoken natural language request to the caller and providing an estimate of time before the call recipient will be able to service the call; and
    obtaining a non-telephone number contact address from a pre-stored caller profile at which the call recipient is to contact the caller, wherein the pre-stored profile contains a plurality of contact addresses that are organized in accordance with a time of day that is to be used in a call back.

11. The non-transitory computer readable medium of claim 10, wherein parsing includes parsing the freeform spoken natural language request for at least one keyword and the assigning the call recipient is implemented based on the keyword recognized in the parsing.

12. The non-transitory computer readable medium of claim 10, the program further comprising the step of:
    detecting a volume level of the call to further indicate the nature of the freeform spoken natural language request.

13. The non-transitory computer readable medium of claim 10, the program further performing the step of:
    forwarding a copy of the freeform spoken natural language request to the call recipient.

14. The non-transitory computer readable medium of claim 10, wherein the freeform spoken natural language request is parsed for keywords to make a determination of an issue that the caller would like resolved, wherein the call recipient is assigned based upon this determination.

15. The non-transitory computer readable medium of claim 10, the program further performing the step of:
    announcing a name of the call recipient assigned to service the call to the caller.

16. The non-transitory computer readable medium of claim 10, the program further performing the step of:
    prompting the caller to provide a contact address where the call recipient is to call back the caller.

17. The non-transitory computer readable medium of claim 10, wherein the call recipient is assigned based on a relative queue size of the call recipient in comparison to other candidates for handling the call.

18. The non-transitory computer readable medium of claim 10, the program further performing the step of:
    determining the estimate of time based on the number of calls in a call recipient's queue, a categorization of a nature of each call in the queue, and an average amount of time that a call of each respective categorization takes.

* * * * *